Sept. 21, 1943.   R. J. WILSON   2,329,806
REFINISHING TOOL FOR CRANK PINS
Filed March 15, 1941   2 Sheets-Sheet 1
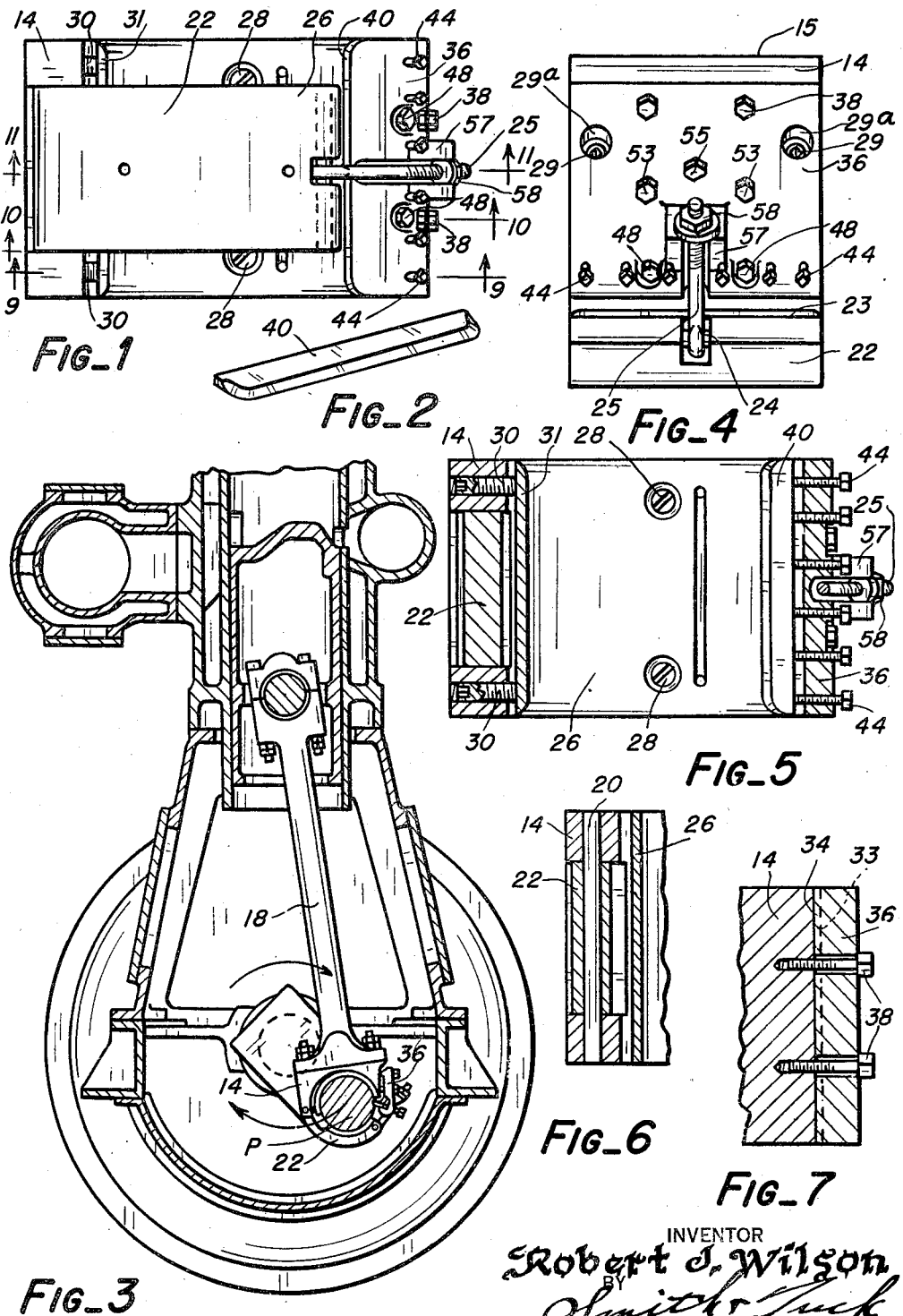

Sept. 21, 1943. R. J. WILSON 2,329,806
REFINISHING TOOL FOR CRANK PINS
Filed March 15, 1941 2 Sheets-Sheet 2
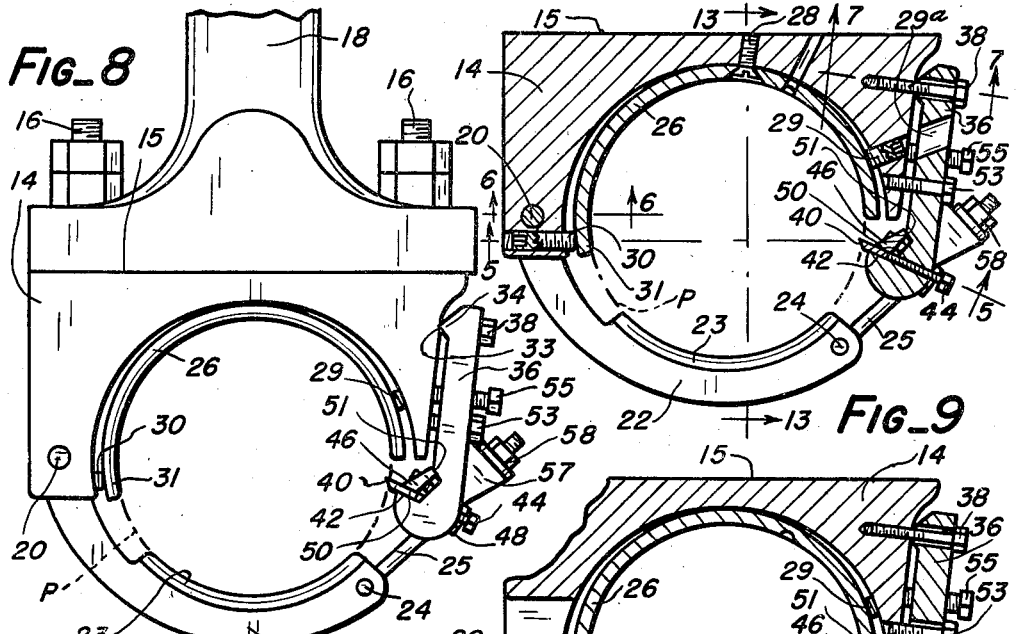
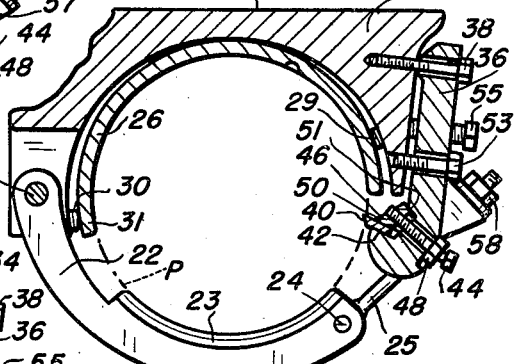
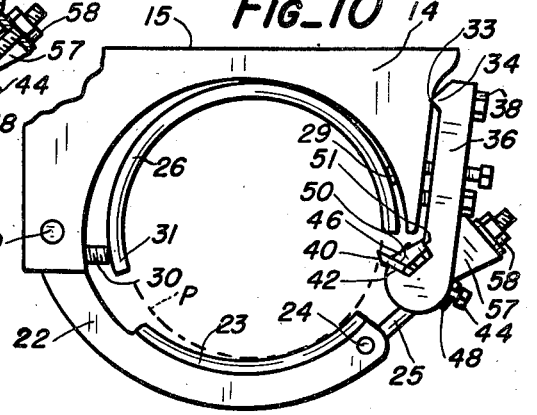
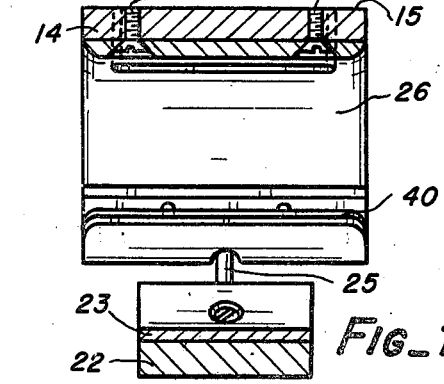
INVENTOR
Robert J. Wilson
BY
Smith Tuck
ATTORNEYS Patented Sept. 21, 1943

2,329,806

UNITED STATES PATENT OFFICE 2,329,806

REFINISHING TOOL FOR CRANKPINS

Robert J. Wilson, Seattle, Wash.

Application March 15, 1941, Serial No. 383,595

4 Claims. (Cl. 82—4)

My present invention relates to the art of machine tools and more particularly to a refinishing tool for crank pins.

My invention consists of a member substantially the same size as the crank pin bearing which is clamped about the crank pin and is provided with a cutter extending the full length of the crank pin and which is adapted to reface the same when the shaft is rotated within my tool as the tool itself is held against rotation. In many respects my tool operates in the same manner as my crank pin refinishing tool disclosed in United States Letters Patent No. 1,660,539. My present tool, however, has certain marked advantages over my former tool that tends to insure greater accuracy and permits of more general application of the tool.

As the crank pin of engines wears either in normal use or through faulty lubrication or from other causes, they rarely wear evenly throughout their periphery. A crank pin naturally is subjected to greatest pressure for but a short portion of its entire travel; this being during the peak loading of the piston the bearing serves. Therefore, the crank pin usually has its greatest wear on one side and is thus worn out of round; then, too, long continued wear often tends to score the pins. In any event it is necessary that sufficient metal be moved from the pin in order to bring it back to a true cylindrical bearing which will be smooth to the end that the protective oil film can be maintained between the crank pin and the crank pin bearing.

At present the normal method of refinishing the bearings is to remove the shaft from the engine and to set it up in a lathe of sufficient size so that the crank pin bearings can be revolved about their longitudinal axis. All this entails expensive skilled labor and in some instances, where very large crank shafts are under consideration, facilities are not readily available that have the capacity to handle such work. It is under such conditions that my crank pin refinishing tool serves to the utmost. The tool itself may be produced very cheaply and in the case of large power plants one can be carried with the power plant so that repairs can be made at very out of the way points if conditions require it.

The principal object of my present invention, therefore, is to provide a tool for refinishing crank pins that is simple in construction and which will permit the accurate refinishing of crank pins without the necessity of removing shafts from the engine bed.

A further object of my present invention is to provide a refinishing tool which may be substituted for the normal crank pin bearing and be connected, if desired, to the piston connecting rod in such a manner that the piston itself serves as a securing and guiding means for my tool as the crank shaft is revolved in the process of refinishing the crank pin periphery.

A further object of my invention is to provide a tool of sufficiently rigid structure that a machine cut can be taken by a cutter extending the full length of the bearing surface of a crank pin.

Still another object of my present invention is to provide a crank pin refinishing tool so arranged that as the crank pin becomes reduced in size, my device may be accurately fitted to the same to the end that the refinishing operation will be accurately conducted.

A further object of my invention is to provide means whereby the blade of my cutting tool may be adjustably held in an exact position.

Other and more specific objects will be apparent from the following description taken in connection with the accompanying drawings, wherein Figure 1 is a bottom plan view of my device.

Figure 2 is a perspective view of the blade employed in my cutting tool.

Figure 3 is a vertical, sectional view through a cylinder of an internal combustion engine showing the manner in which my precision tool is used.

Figure 4 is a side elevation of my tool.

Figure 5 is a cross-sectional view taken along the lines 5—5 of Figure 9.

Figure 6 is a fragmentary, cross-sectional view taken along the line 6—6 of Figure 9.

Figure 7 is a fragmentary cross-sectional view taken along the line 7—7 of Figure 9.

Figure 8 is an end view of my device taken in the same general relationship as indicated in Figure 3.

Figure 9 is a cross-sectional view taken along the line 9—9 of Figure 1.

Figure 10 is a cross-sectional view taken along the line 10—10 of Figure 1.

Figure 11 is a cross-sectional view taken along the line 11—11 of Figure 1.

Figure 12 is a view showing my tool in the same relative position as shown in Figure 8, but with the inner liner in its extreme adjusted position.

Figure 13 is a cross-sectional view taken along the line 13—13 of Figure 9.

Referring to the drawings, throughout which like reference characters indicate like parts, 14 designates the main body or base of my refinishing tool. This is preferably cast of suitable metal and is of the same general dimensions normally as the crank pin bearing used on the pin to be refinished. Base 14 with this end in view is provided with a machined upper surface 15 and a plurality of studs 16 which are adapted to engage the lower foot of the connecting rod 18, or if the refinishing is not to be done with the crank shaft in the engine bed, then a suitable lever should be secured thereto so as to prevent rotation of the tool. The base should be of sufficient extent to encircle approximately one-half of the crank pin. One side is pivoted, at 20, a retaining member 22. This member is provided preferably with a liner as 23 of bearing metal so that it will have no tendency to score the bearing. At its opposite end retainer 22 has pivotally secured to it as at 24 a single tension member or a plurality of tension members 25. Base 14 is provided with a bearing member or liner 26 which is complementary to liner 23 and is secured to the base as by one or more screws 28. An adjusting means is provided by a plurality of screws 30 which are threaded into base 14 so that the extreme end 31 of liner 26 can be forced inwardly so as to adapt the liner more closely to the crank pin bearing particularly after machining has reduced the diameter of the pin. An exaggerated adjustment of this liner is indicated in Figure 12.

On its opposite side base 14 has a V-shaped groove 33 machined therein in a manner to be parallel with the axis of the crank pin. Adapted to seat in groove 33, with reasonable clearance, is a V-shaped ridge 34 formed as part of tool holder 36. A plurality of tap screws 38 are disposed alined with ridge 34 and are tapped into base 14. The holes through which they pass into holder 36 are made somewhat larger than the body size of the screw so that the tool holder can rock slightly within groove 33 as adjustment requires. This arrangement is probably best shown in Figures 9 and 10.

At its lower end, as shown in my various views, tool holder 36 is provided with a seat for the cutting tool or blade 40. This seat as will be observed in the different views is provided with a rest portion at 42 which is accurately machined so that the cutter or blade 40 may be accurately alined with the axis of the crank pin which is generally designated by the reference characters P. A plurality of set screws 44 are alined with the base of cutter 40 and are threaded into the tool holder 36 in such a manner that by adjusting the screws the cutting edge of cutter 40 may be accurately positioned and once positioned, accurately maintained in that position. To clamp cutter 40 in position I provide the clamp bar 46 which is in turn held in place by a plurality of cap screws 48. These screws pass through body size holes in holder 36 and are threaded into bar 46. It will be observed from the drawings that bar 46 is provided with tapering sides as 50 and 51 so that as the bar is pulled down into the holder by screws 48 it will wedge into position and thus securely hold cutter 40 in its adjusted position.

After cutter 40 has been positioned and clamped the entire tool holder 36 may then be adjusted to give the depth of cut desired or to make successive cuts as required. This is accomplished by providing a plurality of screws 53 which pass through slightly oversize holes in holder 36 and are threaded into base 14— so that they can be adjusted to move the tool holder to the left as viewed in the various views 8 to 12, inclusive. To resist the action of screws 53 and 38 I provide one or more screws 55 which is threaded into holder 36 and which bears against the face of base 14. In this manner holder 36 may be securely held in an adjusted position where it is spaced away from base 14 except for the engagement of ridge 34 with groove 33.

Holder 36 is provided with one or more, as desired, bifurcated bosses 57 which is placed to form a seat for nut 58. Tension on this nut, in turn, clamps retainer 22 in position.

Method of operation

While it will be apparent, it is believed, that my refinishing tool might be adapted to minor variations from a standard size it is normally intended, particularly in the larger sizes, that the tool will be particularly adapted to the size crank pin it is to refinish. This is usually the more satisfactory manner in that the size of crank pins vary through wide limits and the length of the bearing for the same size will vary in different makes of engines. Consequently, base 14 would normally be adaptable to but a limited range from the particular pin it is designed for. In order to secure accurate seating of my tool, the liners 23 and 26 should normally be machined with reasonable accuracy to fit a particular crank pin to be finished.

The next step is to fit my refinishing tool to the crank pin in question. This is done by the proper adjustment of the cutting blade 40 by means of screws 44 clamping the same in place by means of screws 48 and then to adjust holder 36 in a fixed position by means of its adjusting screws. It will be noted that the extreme end of cutter 40 can be ground to any desired radius so that a fillet can be provided at each end of the crank pin having the exact radius desired. These too will be smoothly and accurately finished as is the crank pin.

It is necessary then to provide means which will prevent my refinishing tool from revolving. If the work is being done with the crank shaft in the engine bed then my tool can best be secured to the connecting rod 18 after the showing of Figure 3 and the piston used as a crosshead or guide. If the crank shaft on the other hand is out of the engine and set up as in a lathe or on V-blocks or other suitable bearings that will permit it to revolve, then a reasonably long lever should be secured by means of studs 16 and then either blocked or held against movement.

With my refinishing tool thus in position and with the retaining member 22 secured in position, the crankshaft is then slowly revolved. This can usually best be done by hand even in the case of relatively large crank shafts where the diameter may be 18 or 20 inches, as means are usually available for the slow revolving of the shaft by hand. This is not a difficult operation despite the fact that cutter 40 extends the full length of the crank pin, due to the fact that it has been found to be most satisfactory to take a very light cut from the pin. After one cut is taken around the pin it may be found that the pin has not been entirely cleaned up or reduced to a true cylindrical surface and by adjustment of the tool holder successive cuts are taken until a true cylindrical bearing has been achieved. In following out this method the shaving removed from the shaft will normally be paper thin, normally from 1/1000 to 3/1000 of an inch and it is because of this relatively thin shaving that the work can be done by hand and further all chattering or tool markings on the crank pin is avoided. The crank pin as completed will present a true smooth surface which will lend itself readily to maintaining the oil film that is so essential to a bearing of this character if long useful life is to be expected of it.

It is desired to point out that due to the fact that the work is not done rapidly as though it were in a lathe, the operator can observe the functioning of the tool at all times and, using the proportions shown, there is ample space provided for any accumulation of metal that is removed from the crank pin. When the pin has been reduced to a true smooth cylindrical surface my refinishing tool has completed its function and may be removed.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. A tool for refinishing crank pins in place in an engine, said tool comprising a base adapted to be secured to the lower foot of a connecting rod in an engine and having a jaw to encircle substantially one-half of a crank pin, a flexible liner secured in said jaw and said base having means for inwardly flexing said liner to provide a curvature thereof that will accommodate the liner to a substantial portion of the surface of a crank pin to be refinished, a retaining latch link pivoted to said base on one side of the jaw and adapted to further encircle a crank pin to be refinished, a tool holder rockably secured to said base across the jaw from the point of pivot of the retaining latch and having a movable tool blade to engage the face of a crank pin, means for moving the tool blade to advance it into the work without moving the holder, and a tension member between said retaining latch and said tool holder adapted to draw the tool base and latch link about a crank pin to position the tool blade to shave a cutting from the face of the crank pin.

2. A tool for refinishing crank pins in place in an engine, said tool comprising a base adapted to be secured to the lower foot of a connecting rod in an engine and having a jaw to encircle a portion of a crank pin, a flexible liner secured in said jaw, said base having means for inwardly flexing said liner to provide a curvature thereof that will accommodate the liner to a substantial portion of the surface of a crank pin to be refinished, a retaining latch link pivoted to said base on one side of the jaw and adapted to further encircle a crank pin to be refinished, a tool holder rockably secured to said base across the jaw from the point of pivot of the retaining latch and having a tool blade to engage the face of a crank pin, and a tension member between said retaining latch and said tool holder adapted to draw the tool base and latch link about a crank pin to position the tool blade to shave a cutting from the face of the crank pin.

3. A tool for refinishing crank pins in place in an engine, said tool comprising a base having a jaw adapted to encircle substantially one-half of a crank pin, a flexible liner secured in said jaw and said base having means for inwardly flexing said liner to provide a curvature thereof that will accommodate the liner to the surface of a crank pin to be refinished, a retaining latch link pivoted to said base on one side of the jaw and adapted to further encircle a crank pin to be refinished, a pivoted tool holder on said base across the jaw from the point of pivot of the retaining latch and having a tool blade to engage the face of a crank pin, and a tension member between said retaining latch and said tool holder adapted to draw the tool base and latch link about a crank pin to position the tool blade to shave a cutting from the face of the crank pin.

4. A tool for refinishing crank pins in place in an engine, said tool comprising a base having a jaw adapted to encircle a portion of a crank pin, means in said jaw to provide a curvature thereof that will accommodate the jaw face to the surface of a crank pin to be refinished, a retaining latch pivoted to said base on one side of said jaw and adapted to further encircle a crank pin to be refinished, a tool holder rockably mounted on said base across the jaw from the point of pivot of the retaining latch to engage the face of a crank pin, and a tension member between said retaining latch and said tool holder adapted to draw the tool holder and latch link about a crank pin to maintain the tool blade in position to continuously shave a cutting from the face of the crank pin.

ROBERT J. WILSON.